Figure 1:
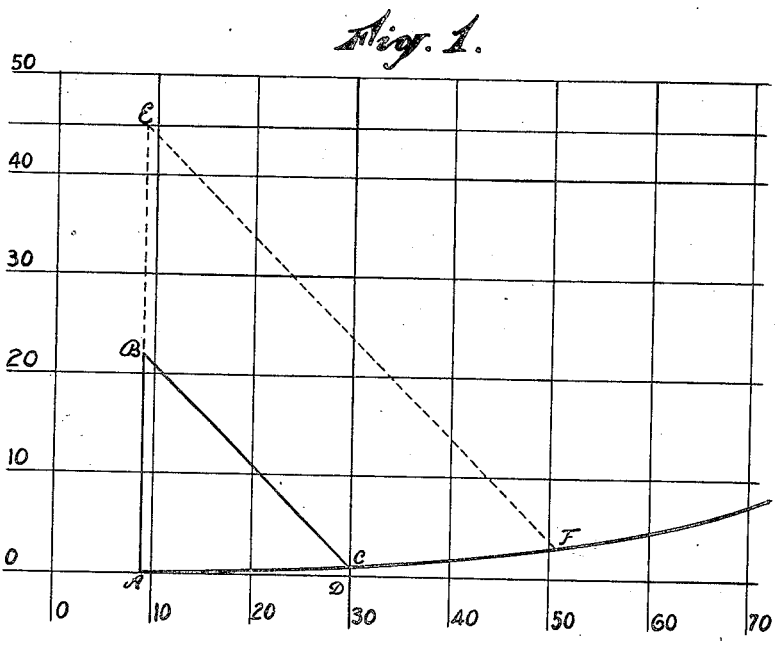

Sept. 4, 1928.　　　　　　　　　　　　　　　　　　1,683,521
J. W. M. BOURGOGNION ET AL
PROCESS OF TREATING WATER
Filed May 17, 1927　　　　2 Sheets-Sheet 1

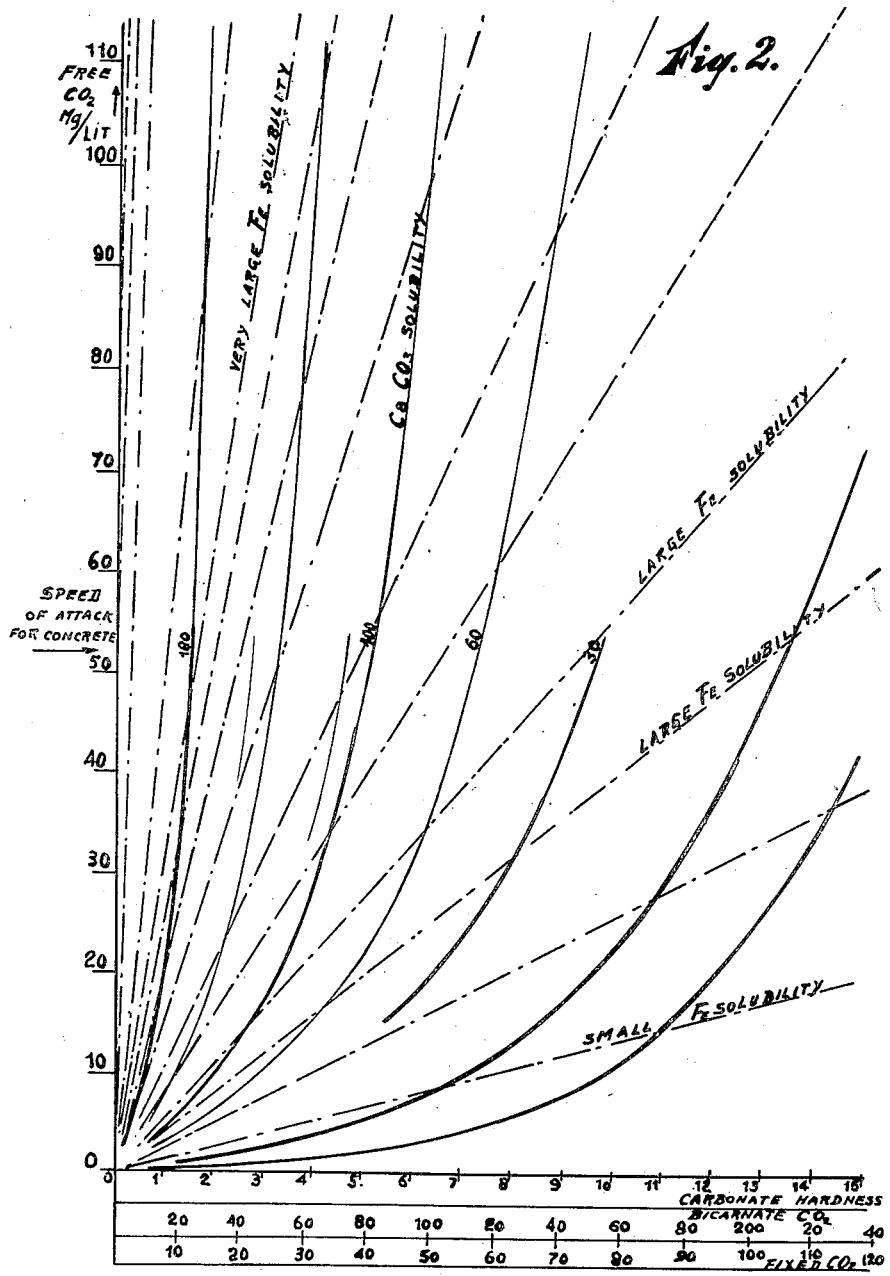

Patented Sept. 4, 1928.

1,683,521

UNITED STATES PATENT OFFICE.

JULIANUS WILHELM MEUSER BOURGOGNION AND CARL LUDWIG PHILIPS, OF NIJMEGEN, NETHERLANDS.

PROCESS OF TREATING WATER.

Application filed May 17, 1927, Serial No. 191,923, and in the Netherlands May 10, 1926.

Our invention relates to a process for the treatment of water for household and industrial purposes.

It is a well known fact that soft water i. e. water containing only small quantities of Ca- and (or) Mg-salts has an injurious effect upon metals and other substances such as concrete. With hard water this drawback also prevails though to a much smaller extent.

Although this phenomenon cannot be ascribed to one single cause it has been found that the so-called "aggressive" $CO_2$ plays a prominent part in these cases.

In view of this fact it has heretofore been proposed to convert the $CO_2$ for example into the form of $NaHCO_3$ or $Ca(HCO_3)_2$ or, when dealing with naturally hard water, to remove the $CO_2$ gas in order to eliminate the corrosive effect. In these cases the nitrates and chlorides and also the oxygen which are present remain in the water and the corrosive effect could not be completely eliminated in this way.

The invention is based on quite a different principle viz, on the well known phenomenon, that the Ca- and (or) Mg-salt in sufficiently hard water will form a more or less coherent layer on the walls of any vessel.

In the appended claims, the expression "a hardening agent of the group including lime and calcium carbonate and the corresponding compounds" is intended to cover lime, calcium carbonate, magnesia or magnesium carbonate, any of which materials will dissolve in water containing $CO_2$ to give water having a temporary hardness.

It has been found, that this layer quite suffices to protect the walls against any deleterious effect.

Fig. 1 represents part of the curve showing the relation between the corresponding and fixed $CO_2$; Fig. 2 represents the relative values of the dissolving power of water as laid down by Mündlein.

The process according to the invention includes, especially, the increasing the temporary hardness of water which as a rule is soft for household and industrial purposes, in order to artificially establish the conditions necessary for the formation of the said layer.

It has further been found, that there is one dominating factor which governs the result to be obtained when increasing the temporary hardness for the said purpose as will be more fully explained hereinafter.

The equilibrium of the Ca-salts, which cause the temporary hardness of water may be represented by the following equation:

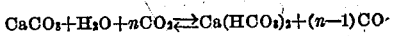

$$CaCO_3 + H_2O + nCO_2 \rightleftarrows Ca(HCO_3)_2 + (n-1)CO_2$$

One half of the $CO_2$ which exists in the form of the bi-carbonate is called: "fixed $CO_2$", the remainder of the $CO_2$ which is present in the water is called: "free $CO_2$"; and when the temperature and pressure are constant there exists a definite relation between "fixed $CO_2$" and "free $CO_2$" when equilibrium prevails, that is to say a certain quantity of fixed $CO_2$ corresponds to a definite quantity of free $CO_2$ when the system is in equilibrium which quantity is called "corresponding $CO_2$".

If the concentration of free $CO_2$ in the water is increased above the amount equal to the corresponding $CO_2$, the remainder of the free $CO_2$ acts as "aggressive $CO_2$".

Tillmans and Heublein have determined in a number of cases the corresponding $CO_2$ with varying quantities of fixed $CO_2$; the results have been laid down in a table; Fig. 1 represents part of the curve showing the relation between corresponding and fixed $CO_2$. The abscissae represent the fixed $CO_2$ (i. e. half of the $CO_2$ of the bi-carbonate) whilst the ordinates show the free $CO_2$, which, on the curve, is equal to the corresponding $CO_2$. The part of the drawing above the curve represents bi-carbonate solutions with an excess of $CO_2$; the remainder represents solutions with a quantity of $CO_2$ which is insufficient for the existence of bi-carbonate i. e. carbonate-solutions.

Applicants have found that increasing the hardness of water will only yield the desired result, when precautions are taken, that the quantity of $CO_2$ present equals the "corresponding $CO_2$." With more $CO_2$ present the excess acts as "aggressive $CO_2$," with less the system consists of aqueous carbonate-solution.

So for example if water is available of a hardness 9 (expressed in terms of fixed $CO_2$), which is insufficient to form the desired precipitate on the walls of tubes or containers through which it is being conducted, and if the free $CO_2$ contained therein is equal to the corresponding $CO_2$ (which is about 0) according to the invention $CO_2$ is led into the water until the amount of free $CO_2$ is sufficiently increased for example to 22. In other words the original water would be represented at A, in Fig. 1, and after absorption of $CO_2$ led in, it would be represented at B, in said figure. The free $CO_2$ content is raised from 0 to 22, by the step of absorbing $CO_2$ in the water, as stated. It will be understood that, in case the water contains already an excess of $CO_2$—which excess is then the aggressive $CO_2$—no further $CO_2$ need be led into the water. The obtained product is thereupon neutralized with the aid of any suitable Ca- or Mg-compound. In the present explanation it is assumed that only Ca-compounds are used for the said purpose. The aggressive $CO_2$ is entirely combined and the desired condition is reached in which, in comparison with the untreated material, an increased hardness of 30 is obtained whilst the free $CO_2$ is automatically reduced to the required amount of corresponding $CO_2$, (about 1). The total amount of $CO_2$ viz 31 does, of course, not undergo any change.

When carrying the process according to the invention into effect the diagram as shown in Fig. 1 will render valuable services as this diagram enables one to immediately determine the various values of $CO_2$ required. In the above instance the relation between free and fixed $CO_2$ of the raw water is represented by A. After increasing the amount of $CO_2$ by 22 the point B is reached and upon then treating the water with $CaCO_3$ or $CaCO_3$-containing substances the relation between free and fixed $CO_2$ moves along the straight line BC which is at angle of 45° with the coordinates (along this line the total amount of $CO_2$ remains constant); point C represents the relation between free and fixed $CO_2$ in the finished product; the new hardness is equal to 30 in this water (point D) whereas the quantity of free $CO_2$ is about 1 (CD).

Should water of a temporary hardness 51 (point F) be desired, the preliminary treatment with $CO_2$ should be continued until point E is reached as follows immediately from the diagram when projecting a straight line at an angle of 45° with the coordinates upward from F which meets the line AB at E at which point the temporary hardness is equal to 9 and the free $CO_2$ is 45.

When conducting this water through a marble-filter (i. e. a casing containing chips of marble) a product with temporary hardness 51 is yielded and with a quantity of free $CO_2$ which in its turn is equal to the corresponding $CO_2$ viz 3.

In "Fire and Water Engineering" 1925, page 378 a process has been described in which the aggressive $CO_2$ is taken up by treatment with lime ($Ca(OH)_2$); it is obvious, that in this case some $CaCO_3$ may form which will deposit on the walls of tubes or containers; it should be noted however, that there is no certainty about the temporary hardness being sufficiently increased for the said purpose in view of the fact that the resultant temporary hardness depends on the amount of aggressive $CO_2$ which chances to be present in the water at hand. In contradistinction therewith, according to the invention means are provided to absolutely ensure a sufficiently increased hardness as the concentration of $CO_2$ on which the resultant hardness depends may within certain limits be raised to any desired degree.

According to the invention water can be obtained which possesses an increased hardness and which most decidedly does not contain any aggressive $CO_2$; the so treated water may form a more coherent layer on the walls of tubes and containers than the original water would; it is obvious, that the water need only be treated in the said manner until the layer is sufficiently thick to withstand the action of usually soft water.

When increasing the temporary hardness in the described manner the amount of $CO_2$ should not be raised above certain limits which are dependent on the material to be protected; a certain temporary hardness corresponds to a definite concentration of $CO_2$ and this concentration governs in its turn the acidity of the water. Now it is shown by Mündlein, that the acidity (i. e. the H-ion concentration) is decisive for the dissolving power of water with regard to various materials. Expressed in Tillmans's units (i. e. in 0.0001 m. g. H-ion) the dissolving power of alkaline water with $h=1.0$ (which means that the water is neutral) is very large with respect to iron. The temporary hardness of water, which is to be conducted through iron pipe-lines or containers, should therefore not be increased above an acidity of $h=0.25$ which should be brought into account when preliminarily leading in $CO_2$ (if necessary).

The values relative to the dissolving power of water have been laid down by Mündlein in a series of curves partly shown in Fig. 2.

The above holds also good if Mg is present as a component of the temporary hardness.

When the water, having the temporary hardness and having the proper relation between the fixed $CO_2$ and free $CO_2$, as above indicated, is passed through a pipe or vessel, the layer or coating of $CaCO_3$ is formed automatically thereupon.

*Example.*

Water of total hardness 2.1 D°, a temporary hardness 2 D°, free $CO_2$ contents of 9.96 m. g. per liter and free $O_2$ of 4.3 m. g. per liter is very corrosive to metals for example to lead (Pb) and iron (Fe) and will also dissolve $CaCO_3$ from concrete. If this water is converted into water with temporary hardness 7 D°—its free $CO_2$— contents being equal to the corresponding $CO_2$—then this water will not any longer be injurious to concrete and only very little injurious to iron.

7 D° temporary hardness corresponds to $$\frac{7}{2.8} \times 22 = 55 \text{ m. g.}$$

fixed $CO_2$. The corresponding quantity of $CO_2$ can easily be determined from Fig. 1 as being 3.9; the total amount of $CO_2$ is therefore 58.9 m. g.

Fixed $CO_2$ is present to the amount of $$\frac{2}{2.8} \times 22 = 15.7 \text{ m. g.}$$

and free $CO_2$ to the amount of 9.96 m. g. in total 25.7 m. g.

To this water should be added therefore $$58.9 - 25.7 = 33.2 \text{ m. g.}$$

$CO_2$ per liter, after which it is conducted through a marble-filter.

In case it should be desired to effect the neutralization of $CO_2$ with the aid of lime, it should be noted, that the combining of $H_2CO_3$ with $Ca(OH)_2$ to bi-carbonate proceeds as follows:

$$Ca(OH)_2 + 2H_2CO_3 \rightarrow Ca(HCO_3)_2 + 2H_2O$$

For each 44 m. g. $CO_2$ per liter the hardness increases by 5.6 D°. If an increase of 5 D° temporary hardness be desired,

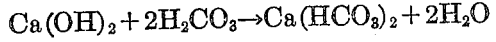

$CO_2 = 78.6$ m. g. $CO_2$ (total) would be necessary. The corresponding $CO_2$ of the new hardness (7 D°) is 3.9 m. g.; 9.96 m. g. free $CO_2$ being present $78.6 - (9.96 - 3.9) = 72.6$ m. g. $CO_2$ should be added.

Reference has been made above mainly to calcium compounds as the hardening agents, but obviously magnesium and the other alkaline earth metal compounds can be likewise included and are included in the scope of the invention wherever "calcium" is used in the claims.

*Résumé.*—Our process, in its preferred form, will be seen to embrace three steps or conditions, in the following order—

First. Having sufficient dissolved $CO_2$ in the water under treatment. (*a*) Some waters may already contain a sufficient amount of $CO_2$ for the purpose, and (*b*) otherwise $CO_2$ as such, will be added to and absorbed in the water, to bring up the free $CO_2$ in the water to the required degree.

Second. The water containing the required amount of $CO_2$ then has its temporary hardness increased. (*a*) This can be done by treatment with $CaCO_3$ or $MgCO_3$ (as by passing the water through a marble filter, or otherwise) in which case any excess of the carbonate is in no way injurious, or (*b*) lime, in the required amount, can be added to the water.

Third. The water, thereby having had its temporary hardness increased to the desired extent and having the above stated ratio between fixed $CO_2$ and free $CO_2$ and free from aggressive $CO_2$, may then be passed into the pipe, tank or other device to be protected, under conditions suitable for the production of a coating of $CaCO_3$ in said device.

What we claim is:

1. The process of treating water, which comprises increasing the temporary hardness thereof by treatment with a hardening agent selected from the group including lime and calcium carbonate, and the corresponding magnesium compounds, taking care always, that the quantity of free $CO_2$ present in the finished product is equal to the corresponding $CO_2$ of the new hardness.

2. The process of treating water according to claim 1, which includes the step of increasing the quantity of $CO_2$ in the water before treating the water with the calcium compound.

In testimony whereof we affix our signatures.

JULIANUS WILHELM MEUSER BOURGOGNION.
CARL LUDWIG PHILIPS.